United States Patent [19]
Hunzinger

[11] Patent Number: 4,504,111
[45] Date of Patent: Mar. 12, 1985

[54] METHOD OF MULTIPLEXING TRANSMISSION CHANELS IN A STEP-INDEX OPTICAL FIBRE AND DEVICE FOR CARRYING OUT THE METHOD

[75] Inventor: Jean J. Hunzinger, Paris, France

[73] Assignee: U.S. Philips Corporation, New York, N.Y.

[21] Appl. No.: 394,993

[22] PCT Filed: Feb. 17, 1981

[86] PCT No.: PCT/NL82/00004

§ 371 Date: Jun. 14, 1982

§ 102(e) Date: Jun. 14, 1982

[87] PCT Pub. No.: WO82/02956

PCT Pub. Date: Sep. 2, 1982

[30] Foreign Application Priority Data

Feb. 23, 1981 [FR] France .................. 81 03527

[51] Int. Cl.³ ............................................. G02B 5/14
[52] U.S. Cl. ........................... 350/96.20; 350/96.19; 350/619; 370/1
[58] Field of Search ............... 350/96.15, 96.16, 96.19, 350/294, 304; 370/1

[56] References Cited

U.S. PATENT DOCUMENTS 4,050,782  9/1977  Uchida et al. ................. 350/96.18

FOREIGN PATENT DOCUMENTS 2266387  10/1975  France ................. 350/96.10
53-81135  7/1978  Japan .................. 350/96.10
1441369  6/1976  United Kingdom ....... 350/96.10

OTHER PUBLICATIONS

*Electro Optic System Design*, vol. 12, No. 6, Jun. 1980 (Chicago, U.S.) "Fresnel Lenses as Fiber-Optic Demultiplexers," p. 20.

Primary Examiner—William L. Sikes
Assistant Examiner—Akm E. Ullah
Attorney, Agent, or Firm—Algy Tamoshunas

[57] ABSTRACT

An optical multiplexer wherein a plurality of channels are formed in a step index optical fiber by groups of light rays which propagate along the fibre by consecutive total reflections at the core/cladding interface. The rays are grouped depending on their angle with the fibre axis so that for each channel, at any point of the fibre, the rays of a given group are situated between two cones whose common apex is formed by that point and which are rotationally symmetrical about a common axis parallel to the fibre axis. The cones define the portion of the angular aperture relating to each channel. The aperture portions relating to all the channels are moreover juxtaposed. A multi-axial optical system directs each of a plurality of light signals along a region defined by the cones so as to inject the light signal into the aperture portion of the associated channel for each channel at the fibre input and reception means which are specific of the aperture portion of said channel at the output.

16 Claims, 6 Drawing Figures

METHOD OF MULTIPLEXING TRANSMISSION CHANELS IN A STEP-INDEX OPTICAL FIBRE AND DEVICE FOR CARRYING OUT THE METHOD

The invention relates to a method of multiplexing data-transmission channels using light waves transmitted along a single step-index optical fibre and an optical device for carrying out this method.

Hereafter a step-index optical fibre is to be understood to mean a fibre whose "core" material has a substantially uniform index of refraction for light, which core is surrounded by a cladding whose index of refraction is also substantially uniform but lower than that of the core. It is known that any ray whose angle with the fibre axis is smaller than the aperture angle of the fibre (which is equal to half the acceptance angle), which aperture angle is a function of the values of the index of refraction of the core and the cladding material respectively, is propagated along the fibre by a number of successive total reflections at the core/cladding interface, the angle of the ray with the fibre axis after each reflection being maintained during propagation.

It is known to increase the number of transmission channels in such an optical fibre by using a light wave of a different wavelength for each channel. Such a method necessitates a spectral filtration of the light, both when it is injected into the fibre and when it is received at the fibre outputs. By virtue of its principle, this method does not restrict the number of modes of propagation generated in the fibre, so that it does not lead to an improvement of the transmission pass-band.

The method in accordance with the invention has several advantages in this respect. The light used has the same wavelength for all the multiplexing channels. Moreover, by virtue of its principle, the number of modes of propagation in each channel is limited, so that the transmission band in each channel is extended.

The method is based on the conservation of the angle that each light ray makes with the fibre axis as it propagates in the fibre. The invention envisages the formation of transmission channels inside the fibre by means of light rays which are grouped in accordance with the values of their angles with the fibre axis, each channel being provided with means for injecting light at the fibre input and means for receiving light at the output, both means being specific of the values of said angle.

For each transmission channel the value of the angle of the rays lies between two values which are comparatively close to each other, so that in any point of the fibre the rays corresponding to each transmission channel are situated between two cones whose common apex is formed by said point and which are rotationally symmetrical about a common axis parallel to the fibre axis, the respective values of their apex angles being one of said two comparatively close values. In any point of the fibre the pairs of cones corresponding to each transmission channel form a nested set, the apex-angle values relating to each pair being selected in such a way that said pairs of cones are juxtaposed or, preferably, separated from each other by spaces which are void of active radiation.

For carrying out this method it is necessary to simultaneously inject in a differentiated manner luminous fluxes at any point of the input surface of the fibre in the angular apertures situated between the two cones corresponding to different transmission channels and simultaneously and, at the fibre output, of simultaneously and in a differentiated manner receiving said luminous fluxes from said different channels in the same apertures.

To this end, the device for carrying out the method in accordance with the invention, in addition to a step-index fibre, comprises a multi-axial optical system at each end of said fibre, which system comprises optical elements each having a single axis, the number of axes being equal to the number of transmission channels in the fibre, the optical elements forming, in the object space, as many conjugate images of the fibre end as there are axes. Each optical element has an annular pupil which is centred relative to the fibre axis, which pupil determines the effective aperture portion of each transmission channel. The annular pupils of all the optical elements overlap or are juxtaposed to one another in such a way that together they fill substantially the entire pupil of the fibre. For the purpose of light injection light sources are arranged at the fibre input at the locations of the conjugate images of the fibre input surface, which sources each emit useful flux into one of the channels through the corresponding annular pupil. For the purpose of reception receivers are arranged at the fibre output, which receivers replace the light sources on the conjugate images of the fibre output surface formed by each of the optical elements.

In a first embodiment the multi-axial optical system has a zone structure comprising a concentric arrangement of annular lens zones (each zone forming an optical element) whose optical centres do not coincide, the zone structure itself forming the pupil of said multi-axial optical system. In contradistinction to the non-coincident optical centres the mechanical centres of the annular lens zones are disposed on the fibre axis. At the input of the fibre the sources are arranged so as to coincide with the conjugate points of the input surface of the fibre which are defined by the various optical centres, i.e. by the various annular lens zones. At the fibre output receivers are arranged in the same way as the sources in the injection device.

In a second embodiment the multi-axial optical system in fact comprises two parts, namely a first part comprising one or a plurality of lenses centred on a single axis, followed by a second part comprising a multi-axial zone structure similar to that used in the first embodiment, which provides the convergence necessary to form images on a plurality of elements and which facilitates the reduction of geometrical aberrations in the image formation.

In a third embodiment the multi-axial optical system again comprises two parts, namely a first part which comprises the entire optical convergence system and which is centred on a single axis, and a second part with a zone structure which, in contradistinction to that in the second embodiment, does not comprise annular lens zones with separate lens powers, but differently oriented annular prismatic zones, which provide the multiplication of the optical axis by means of the principle of deviation.

In a first variant the convergence part and the part with the zone structure are separated, whilst in a second variant the part having a zone structure is included in the convergence part. In this last-mentioned case the part having a zone structure may specifically be situated in the optical space inside the convergence part which comprises at least two elements, at the location where the image of the input surface of the fibre is focussed at infinity. The advantage of this arrangement is that the element with a zone structure functions with parallel beams, i.e. without geometrically aberration.

In a fourth embodiment, which in fact may be regarded as a variant of the three preceding embodiments, the element with the zone structure may be formed by holographic methods, which ensure that they have the same properties and characteristics as the zone-structure elements used in the preceding embodiments.

In a fifth embodiment the optical injection means may be a catoptric optical system which, for example, comprises annular parts of concave mirrors which overlap each other and whose centres of curvature do not coincide, whilst the mechanical centres of the annular parts coincide and are disposed on the fibre axis. This arrangement ensures that each reflecting ring provides a distinct image of the fibre at whose location the source or the receiver corresponding to one of the channels is arranged. Specifically, in accordance with a variant, the mirrors are arranged so that images of the sources or receivers are formed on the fibre with a magnification of −1, which results in aplanatic images.

In a sixth embodiment, which resembles the preceding embodiment, the multi-axial optical system in catadioptric, i.e. it comprises a reflecting part and a refracting part, one of the two being used for obtaining the element with a zone structure, whilst the combination of reflection and refraction may be employed to obtain very distinct images with a magnification which differs slightly from −1, which provides a better physical separation of the location of the sources relative to the fibre.

The invention also proposes the combination of angular multiplexing described in the foregoing and prior-art multiplexing methods by multiplication of the number of spectral bands used.

Embodiments of the invention will be described in more detail, by way of example, with reference to the accompanying drawings, in which.

Figure 1:
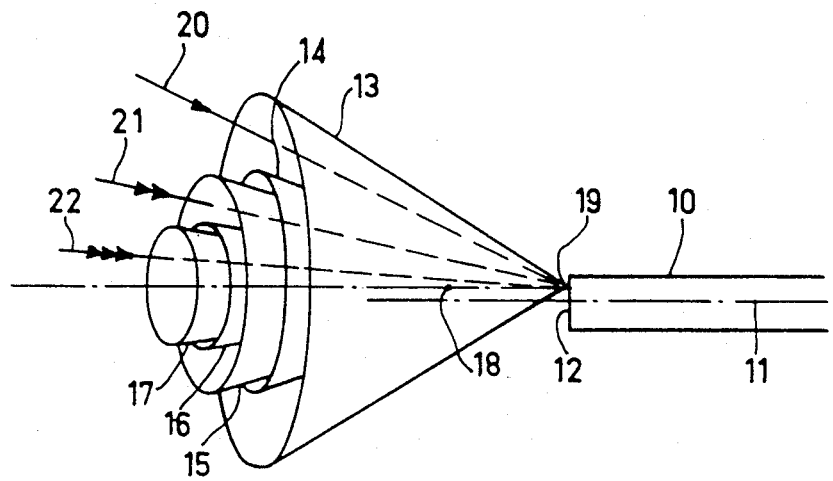
FIG. 1 is a diagram representing the principle of the multiplexing method in accordance with the invention.

In FIG. 1, the numeral 10 designates a step-index fibre, with only the core material being shown for the sake of simplicity. The axis of this fibre is designated 11, and one of its end faces, hereinafter referred to as the input surface, is designated 12. The reference numerals 13, 14, 15, 16, 17 represent a number of cones which are rotationally symmetrical about a common axis 18 which is parallel to the fibre axis 11 and which have a common apex 19 at the input surface 12. These cones form a nested set, their half apex angles decreasing from the cone 13 to the cone 17 and that of the cone 13 being at the most equal to the acceptance or aperture angle of the fibre. It is assumed that there are cones whose axes are parallel to the fibre axis and whose apexes are situated at any off-axis point of the input surface 12. These cones bound spaced or, at the most, juxtaposed portions of the fibre aperture, namely the aperture portions situated between the cones 13 and 14 between 15 and 16, and inside the cone 17. Since the fibre has the property that during propagation the angle of a ray with the fibre axis is conserved, any luminous flux entering at any input point of the fibre, such as the ray 20, 21 or 22, within one of the said angular aperture portions will emerge at the fibre output in an angular aperture portion which is rotationally symmetrical about an axis parallel to the fibre axis and which is identical to that at the input, without angular mixing with a flux injected in a different angular aperture portion at the input. In accordance with the invention, the fibre 10 is provided with directional injection means at the input for three independent fluxes. At any input point, each of these fluxes entirely fills one of the angular aperture portions. At the output, the fibre is provided with independent directional receiving means for these three fluxes. In this way three independent transmission channels are formed in the same fibre.

It is obvious that the number of channels that can be formed depends on the angular aperture portion of the fibre corresponding to each channel. Hereinafter, embodiments of the device for carrying out the method are described which, by way of example, comprise three channels, unless otherwise stated.

Figure 2:
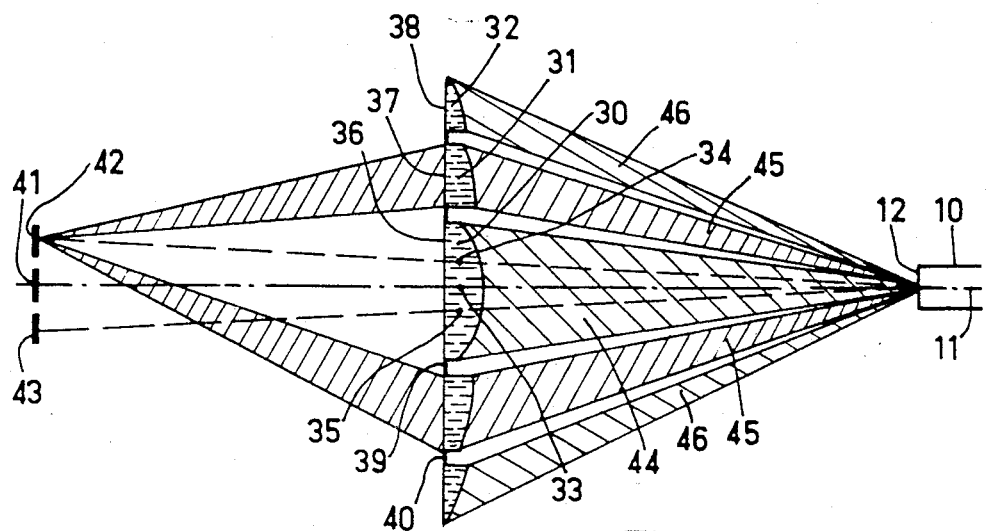
FIG. 2 is a sectional view, through its plane of symmetry, of a first embodiment of the device for carrying out said method.

FIG. 2 represents a first embodiment. This Figure again shows the fibre 10 having an axis 11 and an input surface 12. At the input the fibre is provided with a multi-axial optical system having a zone structure. The system comprises a plurality of lens elements 30, 31, 32, namely a circular element 30 and annular elements 31 and 32. All the elements are mechanically centred relative to the fibre axis 11. Their optical centres are the points 33, 34 and 35, respectively. The pupil of the optical system is formed by its zone structure whose outer diameter is dimensioned so as to coincide substantially with the pupil of the fibre, i.e. from the input surface of the fibre its radius is viewed at an angle which is substantially equal to the aperture angle of the fibre. The lens elements 30, 31, 32 divide the pupil into a plurality of separate transparent portions, namely the central circular portion 36 and the annular portions 37 and 38, which are separated by opaque portions 39 and 40. The various portions are centred relative to the centre of the pupil, i.e. relative to the fibre axis. The conjugate images of the input surface 12 formed by each of the elements 30, 31, and 32 are 41, 42 and 43, respectively. Moreover, the lens elements are dimensioned and arranged in such a way that the conjugate image in the opposite direction of any one of the images 41, 42, 43 formed by a lens element of the multi-axis optical system other than that forming the original image has no part in common with the input surface 12. As a result of this, the fibre only receives the flux which has traversed the respective lens element 30, 31, 32 and stopped down by the respective pupil portion 36, 37, 38 from each of the light sources which are disposed at the respective conjugates 41, 42 and 43 and which emit in the direction of the fibre. Each of the three fluxes received by the fibre is situated within one of the angular aperture portions which are situated near said pupil portions and thus spaced therefrom. In FIG. 2 these angular aperture portions are represented by the beams 44, 45 and 46, respectively, which are rotationally symmetrical about the fibre axis and which issue from the sources 41, 42 and 43 respectively, the beam 45 being represented completely, starting from the source 42, and the beams 44 and 46 being only represented at the fibre side for clarity of the drawing. The respective angular aperture of each of these beams is maintained as the beams propagate along the fibre. A multi-axial optical system similar to that described in the foregoing is arranged at the fibre output in the same way relative to the direction of the light and the fibre axis but reversed in comparison with that at the input, the sources being replaced by receivers. Each receiver receives one of the beams without disturbing the angular differentiation established between the three beams at the input, so that a transmission system with three independent channels is obtained.

Figure 3:
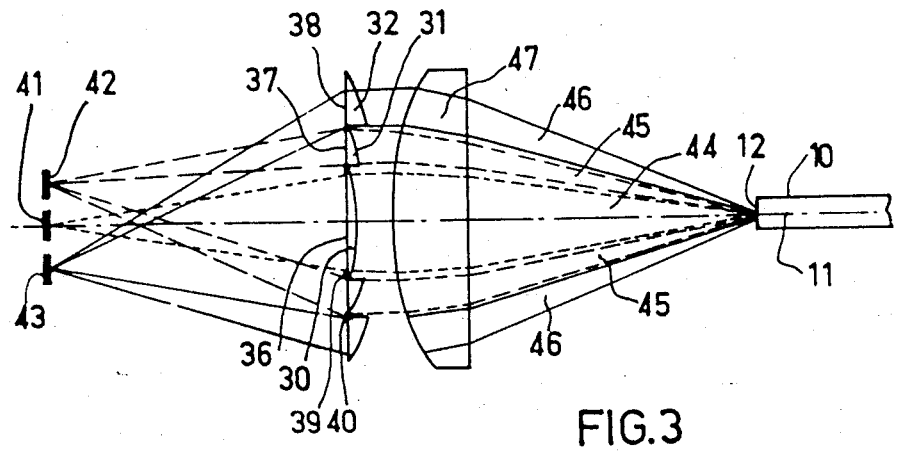
FIG. 3 is a sectional view, through its plane of symmetry, of a second embodiment of the device for carrying out the method.

FIG. 3 represents a second embodiment of the device based on a principle slightly different from that of the first embodiment. In addition to the element having a zone structure as in the first embodiment described in the foregoing, the multi-axial optical system comprises, both at the input and at the output, a lens or a lens assembly whose optical axis coincides with the fibre axis. In FIG. 3 this lens is the lens 47. By means of the converging action of lens 47, it is easier to obtain the required aperture and to solve the problems of geometrical aberration in the image formation than with the single zonal element. Except for the lens 47, all the other elements of FIG. 3 have the same reference numerals as the corresponding elements in FIG. 2. The device comprises three independent channels represented by the respective beams 44, 45 and 46 issuing from the sources 41, 42 and 43, respectively.

Figure 4:
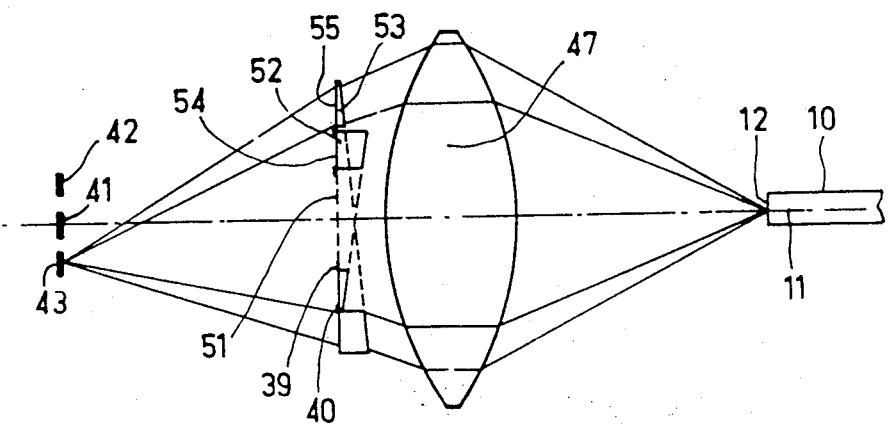
FIG. 4 is a sectional view, through its plane of symmetry, of a third embodiment of the device for carrying out said method.

FIG. 4 represents a third embodiment wherein the multi-axial optical system comprises the convergent element 47, which is centered on the fibre axis 11, and a zonal element which, instead of being formed by lens elements as shown in FIG. 2, comprises elements in the form of differently oriented prismatic rings 52 and 53 and the circular element 51 disposed within the ring 52. The rings and the circular element are centred on the fibre axis 11. The different orientations of the prisms ensure that formation of three different conjugate images 41, 42 and 43 of the input surface 12 of the fibre by the optical assembly, namely the conjugate image 41 via the element 51 and the conjugate images 42 and 43 via the respective prismatic rings 52 and 53. As in the foregoing, three independent light sources disposed at the location of 41, 42 and 43 feed three independent fluxes into the fibre at the three separate aperture portions of the fibre which are situated near the central pupil portion 51 and the transparent annular pupil portions 54 and 55 respectively, spaced by the opaque annular portions 39 and 40. The independent fluxes are received at the fibre output, as already stated, by an optical system which is similar to that at the input and which comprises receivers.

Variants of all these embodiments are possible. For example, in a variant of the second embodiment the convergent element comprises a plurality of lenses and the zonal lens element is arranged between two of these lenses. In a variant of the third embodiment, a similar arrangement is adopted for the prismatic zonal element. Specifically, the prismatic zonal element is arranged in the converging element at the location where the image of the fibre input surface is reflected towards infinity, so that the prismatic zonal element operates with a parallel beam, i.e. without geometrical aberration.

In a fourth embodiment, which in fact may be regarded as a variant common to the three embodiments described in the foregoing, the zonal element of the multi-axial optical system is an element obtained by holographic methods.

Figure 5:
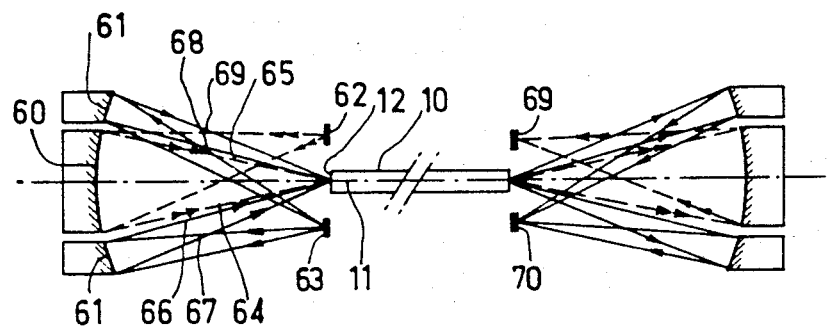
FIG. 5 is a sectional view, through its plane of symmetry, of a fourth embodiment.

FIG. 5 shows a fifth embodiment of the device. This Figure shows the fibre 10 with the axis 11 and the input surface 12. The multi-axial optical system at each end of the fibre is of the catoptric type having a zone structure of concave mirrors, namely a central mirror around which annular mirrors which overlap each other are arranged, their mechanical centres being coincident and being situated on the fibre axis 11 and their centres of curvature being non-coincident and not being disposed on the fibre axis. In order to facilitate the drawing, FIG. 5 shows only two mirros, namely the mirrors 60 and 61 at the input side of the fibre. The conjugate images of the surface 12 formed by said mirrors and 62 and 63, respectively. The conjugate images 62 and 63 formed by the respective mirrors 61 and 60 are spaced from surface 12, so that the light sources arranged at 62 and 63 only emit light into the fibre in accordance with the two spaced portions of the fibre aperture which correspond to beams which are rotationally symmetrical about the fibre axis and which are bounded by the rays represented by the double arrows 64 and 65, respectively, and the single arrows 66, 67 and 68, 69, which are tangent to the mirrors 60 and 61 respectively, the fluxes conveyed by said beams being independent. FIG. 5 shows a multi-axial optical system at the output of the fibre, which system is identical to that at the input but which is arranged the other way around. After propagation along the fibre, without angular mixing, said fluxes are received separatedly by the receivers 69 and 70 arranged similarly to the sources 62, 63. Thus, the device provides two independent transmission channels. Suitably, the mirrors are arranged in such a way that the images of the sources or the receivers are formed on the fibre with a magnification of $-1$, so that said images are aplanatic.

In a sixth embodiment, which in view of the foregoing will be evident to those skilled in the art, the multi-axial optical system is catadioptric, i.e. it comprises a reflecting part and a refracting part, the zone structure which refracts the angular fibre aperture being incorporated in one of the parts. Suitably, this combination of reflection and refraction is employed in order to ensure that the sources are imaged on the fibre with a magnification which differs slightly from $-1$, which enables the sources to be arranged far enough from the fibre during manufacture of the optical system.

In accordance with the invention the number of transmission channels may be increased by a combination of prior-art multiplexing through multiplication of the number of wavelengths used and the angular multiplexing method described in the foregoing.

In a variant, a single multi-axial optical system having a structure identical to that used in one of the foregoing embodiments may be provided at each fibre end, whilst the light sources and the receivers each comprise a plurality of juxtaposed elements each either emitting light of one of the selected wavelengths or each receiving light of one of these wavelengths.

Figure 6:
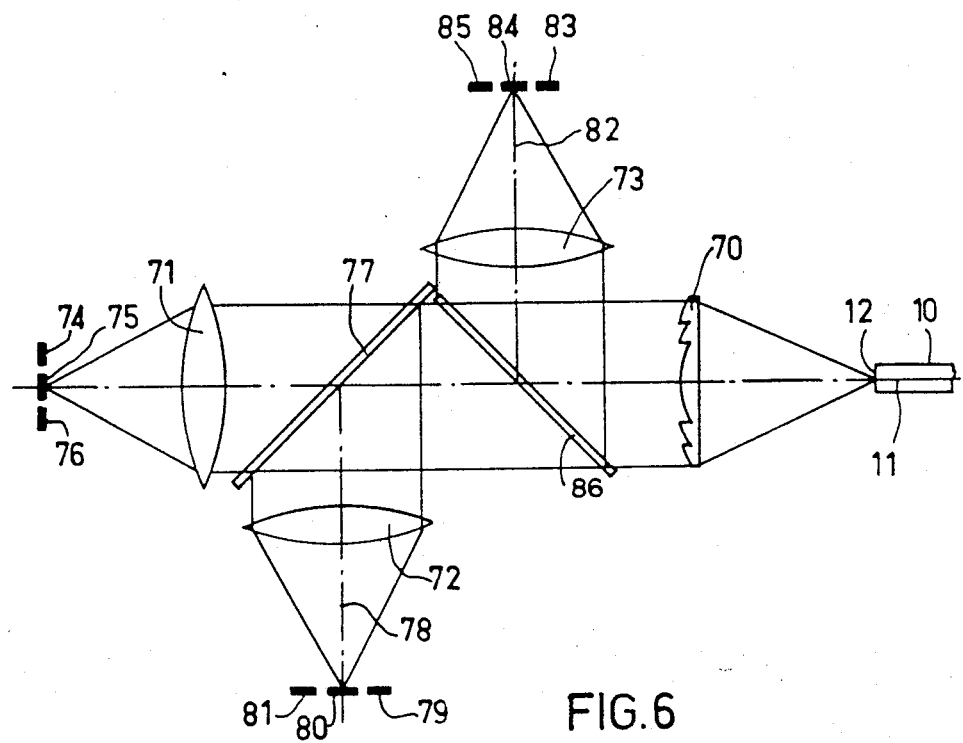
FIG. 6 is a sectional view, through its plane of symmetry, of an embodiment in which multiplexing by multiplication of the number of spectral bands of the light used is combined with the multiplexing method represented in FIG. 1.

In a second variant use is made of a number of multi-axial optical systems identical to those described at each fibre end, the number of optical systems being equal to the number of wavelengths to be transmitted. The optical systems are each provided with either sources each emitting one of the wavelengths or receivers which each receiving and detecting one of said wavelengths. FIG. 6 schematically represents such an optical arrangement using three wavelengths. Again it comprises the fibre 10 having an axis 11. At the input, facing the fibre, a first multi-axial optical system is arranged. The system is similar to that shown in FIG. 3 and comprises the zone structure 70 and the convergent lens 71. Light sources which, for example, emit red light and which are arranged at the locations of the conjugate images 74, 75 and 76 of the fibre input 12, enable three transmission channels for red light to be obtained in the fibre 10 by means of the angular differentiation provided by said multi-axial optical system. The numeral 77 represents a dichroic mirror which is transparent to red light and which reflects, for example, blue light. A lens 72 is placed on the axis 78 which is the image of the axis 11 reflected by the mirror 77. The zone element 70 and lens 72 form a second multi-axial optical system. The conjugate images of the fibre input 12 formed by this second optical system are 79, 80 and 81. Light sources emitting blue light and arranged at the locations of these images enable three further transmission channels for blue light to be obtained in the fibre 10 by means of angular differentiation, which channels are superimposed, in angular terms, with those for red. The numeral 86 represents a dichroic mirror which is transparent to red and blue but which reflects, for example, green. A third lens 73 arranged on the axis 82, which is the image of the axis 11 reflected by the mirror 86, in conjunction with the zone element forms a third multi-axial optical system. The conjugate images of 12 formed by this third optical system are 83, 84 and 85. Light sources which emit green light and which are arranged at the locations of these conjugate images enable three further transmission channels for green light to be obtained in the fibre, yielding nine channels in total. At the fibre output, an optical assembly is arranged which is identical to that described in the foregoing, the light sources which emit blue, green and red light respectively being replaced by receivers which are sensitive to blue, green and red respectively.

What is claimed is:

1. A device for multiplexing light signals comprising a step-index fibre having an input end and an optical means for directing a plurality of light signals onto said input end, said optical means directing respective light signals along respective conical regions which converge to a common apex adjacent said input end and which are rotationally symmetrical about a common axis which is parallel to the longitudinal axis of said fibre so as to form in said fiber a plurality of channels for transmitting said light signals, each of said channels being formed by a group of light rays which propagate along said fibre through consecutive total reflections at the core/cladding interface of said fiber at a given range of angles relative to said longitudinal axis of said fibre.

2. A device as claimed in claim 1 wherein said light signals have the same wavelength and each of said channels conveys a respective one of said light signals.

3. A device as claimed in claim 1 wherein said optical means comprises two parts, namely a first convergence part comprising at least one lens centred on a single axis and a second part comprising an element with a zone structure having a concentric arrangement of annular lens zones whose optical centres do not coincide.

4. A device as claimed in claim 1 wherein said optical means comprises two parts, namely a first convergent part comprising at least one lens centred on a single axis and a second part having a zone structure comprising differently oriented prismatic rings.

5. A device as claimed in claim 4, wherein the zonal part is arranged within the convergence part.

6. A device as claimed in claim 4, wherein the convergence part and the zonal part are distinct.

7. A device as claimed in claim 3 or 4 wherein said zone structure is formed by a hologram.

8. A device as claimed in claim 1 wherein said first-named plurality of light signals have the same wavelength and including means for injecting at least one further light signal of a different wavelength into at least one of said channels.

9. A device as claimed in claim 8 wherein said optical means includes a multi-axial optical system comprising a plurality of concentric optical elements centered relative to said longitudinal axis of said fibre, each of said optical elements having a single axis and forming a conjugate image of said input end, said device further including a first plurality of light sources each producing a respective one of said light signal of said first-named plurality, each of said light sources of said first plurality being arranged at the location of a respective one of said conjugate images, the light from each source of said first plurality being directed by the associated optical element along a respective one of said conical regions, and at least one further light source for producing said at least one further light signal, and wherein said injecting means includes a dichroic mirror disposed between said first plurality of light sources and said optical system, said dichroic mirror being arranged to direct light from said further light source onto one of said optical elements.

10. A device as claimed in claim 1 or 2 wherein said optical means includes a multi-axial optical system comprising a plurality of concentric optical elements centered relative to said longitudinal axis of said fibre, each of said optical elements having a single axis and forming a conjugate image of said input end, said device further including a plurality of light sources each producing a respective one of said light signals, each of said light sources being arranged at the location of a respective one of said conjugate images, the light from each source being directed by the associated optical element along a respective one of said conical regions.

11. A device as claimed in claim 10 wherein said optical system has a zone structure comprising a concentric arrangement of annular lens zones which are mechanically centred relative to the fibre axis, which zones each constitute one of said optical elements and whose optical centres do not coincide.

12. A device as claimed in claim 10 wherein one of said optical elements has a circular pupil and the other of said optical elements have annular pupils extending about said circular pupil, said optical elements being arranged such that said pupils thereof together substantially fill the pupil of said optical fiber.

13. A device as claimed in claim 10 including a further multi-axial optical system disposed adjacent an output end of said optical fiber, said further optical system comprising a further plurality of concentric optical elements centered relative to said longitudinal axis of said fiber, each of said optical elements of said further plurality forming a conjugate image of said output end of said optical fiber, said device further including a light receiver disposed at the location of each of said conjugate images of said output end.

14. A device as claimed in claim 10 wherein said optical system is of the catoptric type wherein said optical elements are concave mirrors which overlap each other, said mirrors having centers of curvature which are non-coincident and mechanical centers which coincide and are situated on the longitudinal axis of said optical fiber.

15. A device as claimed in claim 10 wherein said optical system is of the catadioptric type comprising a reflecting portion and a refracting portion, one of said portions having a zone structure.

16. A device as claimed in claim 14 wherein said mirrors are arranged so as to form said conjugate images with a magnification of −1 so as to provide aplanetic operation.

* * * * *